Figure 1:
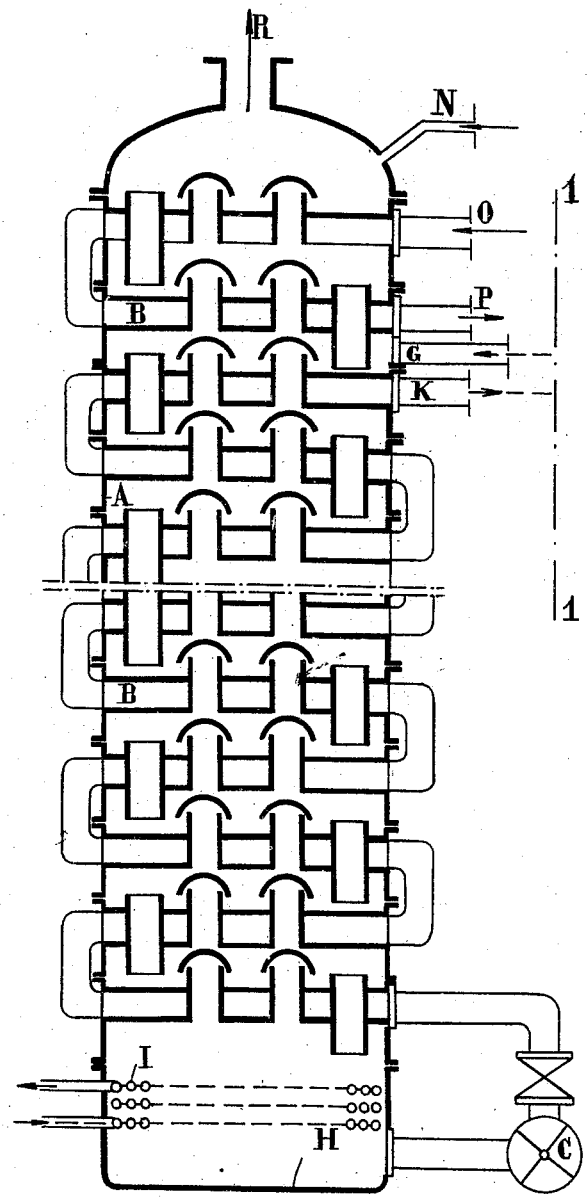

Patented Jan. 27, 1931

1,790,303

UNITED STATES PATENT OFFICE

ALBERT GOSSELIN, OF MONTEREAU, FRANCE, ASSIGNOR TO SOCIÉTÉ L'AIR LIQUIDE, SOCIÉTÉ ANONYME POUR L'ÉTUDE ET L'EXPLOITATION DES PROCÉDÉS GEORGES CLAUDE, OF PARIS, FRANCE

REGENERATION OF CARBONATED AMMONIACAL SOLUTIONS

Application filed February 14, 1929, Serial No. 339,983, and in France February 29, 1928.

The present invention relates to the regeneration of carbonated ammoniacal solutions, those for example which have been used for removing the carbonic acid contained in water gas or gas produced by the distillation of coal, and which may contain, in addition to the carbonic acid, a certain quantity of sulphuretted hydrogen and other compounds retained by the ammoniacal solution. For this regeneration, the carbonated ammoniacal solutions are heated in order to free the carbonic acid and eventually the other contained gases. With solutions sufficiently dilute it is possible to keep practically all the ammonia in the regenerated solution and thus to separate the carbonic acid from the ammoniacal solution, which can then be used again for washing the gases.

The apparatus which has been employed up to the present for this regeneration consists of a column of plates heated at the lower part and cooled by the injection of water at the upper part, and into which the solution to be regenerated is introduced at a point about a third of the distance down after having been heated by circulation in indirect contact with the regenerated solution coming from the regenerating column.

In practice, however, this recovery of the heat of the regenerated solution by the solution which is to be regenerated, can be only partial, as in the first place the regenerated solution leaves the column at about 90–100° C., and in the second place the carbonated solution may be heated only to about 65° C., since otherwise it decomposes and the ammonia is given off together with the carbonic acid set free, resulting in a loss of ammonia.

The object of the present invention is to improve the heat recovery by permitting the regenerated solution to leave the regenerating column at a temperature very close to that at which the solution to be regenerated reaches said column. With this object, the solution to be regenerated, according to the invention, is heated by circulation in indirect contact with the regenerated solution to a temperature at which the first of these solutions does not decompose appreciably, this being about 65° C., and it is then subjected to rectification and, during the course of this rectification, the heating is continued by circulation in indirect contact with the solution immediately after this latter has been regenerated, this heating being carried out systematically.

Further, instead of directly heating the lower part of the column by steam, and cooling the upper part by injecting water, which makes it necessary to distil part of the regenerated liquid to avoid diluting the solution, it has been found that it is possible to heat the lower part of the column by an external source of heat, steam, for example, by indirect contact, and also that the upper part of the column may be cooled by introducing into this part a part of the cold solution which is to be regenerated and eventually by circulation of water by indirect contact. For heating the lower part of the column it is also possible to make use of the gases which have been heated by compression in the plant in connection with which the regenerating column is generally employed.

Each of the above features contributes to a reduction in the steam consumption necessary for working the plant.

The accompanying drawing shows diagrammatically by way of example, a sectional view of one form of apparatus for carrying out the present invention.

Figure 2:
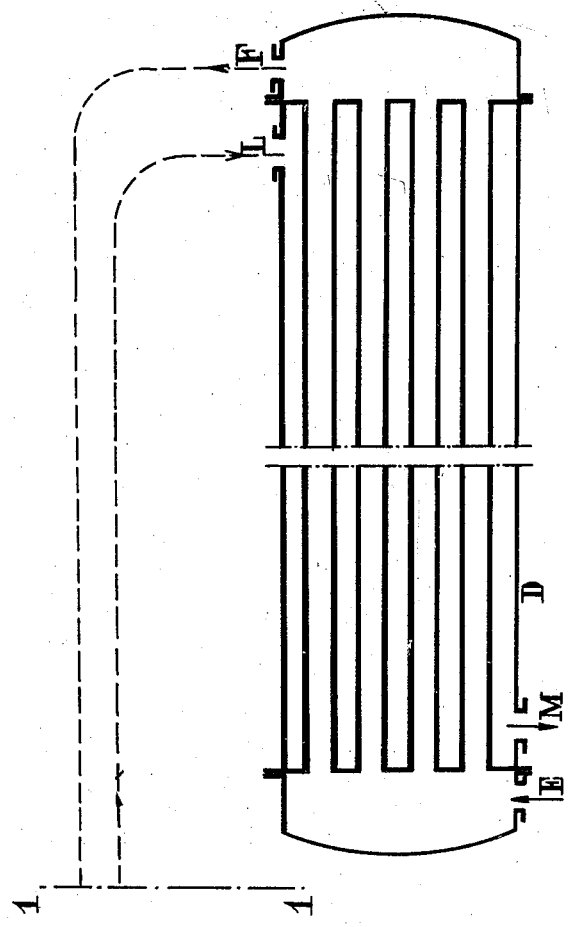

Figure 1 shows the rectifying column and Figure 2 the heat exchanger.

The rectifying column is shown in Figure 1 at A and is provided with plates B, which are partially or completely double-bottomed to permit the circulation therein of the heating or cooling medium. C shows a pump for circulating the solution. D in Figure 2 is the heat exchanger.

The solution which is to be regenerated, containing in practice about 25 to 40 grammes of ammonia per litre, enters the heat exchanger D at E, where it circulates in indirect contact with the regenerated solution. The solution is thus heated to about 65° C., and passes out at F, thence passing into the rectifying column A at G. In this column the solution passes through the plates from the top to the bottom and is rectified by the ascending vapours at the same time that it is heated by the regenerated solution circulating in the bottom of the plates B. The regenerated solution reaches the lower part of the column A where it collects in the compartment H and is heated by steam passing through the coil I. It then leaves said compartment H and passes into the pump C by which it is forced into the bottoms of the plates B in the inverse direction to the flow of the solution in course of regeneration. The regenerated solution is thus again brought to a temperature of about 65° C., and leaves the rectifying column A at K to enter the heat exchanger D at L, leaving said exchanger again at M at approximately the temperature at which the solution to be regenerated arrives at E.

The vapours rising upwards above the inlet G are washed by part of the liquor to be regenerated which, as it has not circulated in the heat exchanger D, is cold, and which is diverted at N to the upper part of the column A. At the same time, these vapours are cooled by the circulation of water in the bottoms of the upper plates B; this water arriving at O and passing out at P. It may happen that the solution which is to be regenerated, and which is used to wash the vapours as described, still contains some uncombined ammonia, and this would result in a loss of ammonia due to the relatively high vapour tension of these solutions. This trouble can easily be avoided by further carbonating these solutions, by bringing them into contact with the residual gases of the column (by circulation in the same direction) before using them for washing the vapours.

The residual gases, composed principally of carbonic acid and sulphuretted hydrogen, pass out from the column A at R.

It will be seen that with the foregoing arrangement it is no longer necessary, as with the arrangements hitherto used, to distil the regenerated ammoniacal solution collected at the foot of the column, which had the disadvantage of causing a loss of ammonia.

What I claim is:

1. A method of regenerating carbonated ammoniacal solutions, which comprises the steps of circulating said solutions in indirect contact with, and in counter-current to, the regenerated solution along the entire travel of each solution; and heating, by means of an external source of heat, the regenerated solution at the end of the regeneration before its return to the counter-current.

2. A method of regenerating carbonated ammonical solutions, which comprises the steps of heating, by means of an external source of heat, the regenerated solution; and returning the heated regenerated solution, in counter-current and in indirect contact with the solution intended for dissociation, along its entire travel, first with the progressively-less-and-less-dissociated portions of said solution and then with the portions of the solution to be preheated to about 65° C.

In testimony whereof I affix my signature.

ALBERT GOSSELIN.